United States Patent
Shimizu et al.

(10) Patent No.: US 9,155,362 B2
(45) Date of Patent: Oct. 13, 2015

(54) CLIP (71) Applicant: NIFCO INC., Yokohama-shi, Kanagawa (JP)

(72) Inventors: Yasutaka Shimizu, Sagamihara (JP); Yuki Hirano, Sagamihara (JP)

(73) Assignee: NIFCO INC., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/357,098

(22) PCT Filed: Nov. 7, 2012

(86) PCT No.: PCT/JP2012/078890
§ 371 (c)(1),
(2) Date: May 8, 2014

(87) PCT Pub. No.: WO2013/069705
PCT Pub. Date: May 16, 2013

(65) Prior Publication Data
US 2015/0173466 A1    Jun. 25, 2015

(30) Foreign Application Priority Data

Nov. 11, 2011   (JP) ................................. 2011-247263

(51) Int. Cl.
*A44B 99/00*   (2010.01)
*F16B 21/08*   (2006.01)
(52) U.S. Cl.
CPC .............. *A44B 99/005* (2013.01); *F16B 21/08* (2013.01); *Y10T 24/309* (2015.01); *Y10T 24/44026* (2015.01)
(58) Field of Classification Search
CPC .. F16B 19/1081; F16B 5/0642; F16B 21/086; F16B 19/008; F16B 2005/0671; F16B 21/06; F16B 21/08; F16B 5/0607; F16B 5/0628; Y10T 24/42; Y10T 24/44; Y10T 24/44026; B62D 27/02; Y10S 411/908; A44B 99/05
USPC .......... 24/455, 458, 595.1, 598.1; 411/41, 45, 411/48, 54.1, 80.1, 347, 360
See application file for complete search history.

(56) References Cited

U.S. PATENT DOCUMENTS 3,964,364 A    6/1976  Poe
4,952,106 A *  8/1990  Kubogochi et al. ............. 411/48
(Continued)

FOREIGN PATENT DOCUMENTS

DE    19530034 A1    2/1997
JP    H07-010528 U   2/1995

OTHER PUBLICATIONS
PCT, "International Search Report for PCT/JP2012/078890".
(Continued)

*Primary Examiner* — Robert J Sandy
*Assistant Examiner* — David Upchurch
(74) *Attorney, Agent, or Firm* — Manabu Kanesaka (57) ABSTRACT

A clip includes a male member having a head portion and a shaft portion, and a female member having a base portion, a fitting portion into an attachment hole for one attachment object, and a reception hole for the shaft portion. The clip is formed to hold another attachment object between the head portion and the base portion. An inside of the reception hole of the female member includes a first sliding contact portion relative to a first cam portion formed at an end of the shaft portion, an engagement concave portion relative to an engagement protrusion formed in a middle of the shaft portion, and a second sliding contact portion located at a hole opening of the reception hole and relative to a second cam portion formed at the engagement protrusion. The shaft portion can be inserted into and released from the female member.

5 Claims, 12 Drawing Sheets

(56) References Cited

U.S. PATENT DOCUMENTS

| | | | | |
|---|---|---|---|---|
| 5,211,519 | A * | 5/1993 | Saito | 411/45 |
| 5,375,954 | A * | 12/1994 | Eguchi | 411/48 |
| 5,641,255 | A * | 6/1997 | Tanaka | 411/48 |
| 6,364,586 | B1 * | 4/2002 | Okada | 411/41 |
| 6,514,023 | B2 * | 2/2003 | Moerke | 411/45 |
| 6,769,849 | B2 * | 8/2004 | Yoneoka | 411/45 |
| 6,979,162 | B2 * | 12/2005 | Kato | 411/371.1 |
| 7,222,398 | B2 * | 5/2007 | Koike | 24/297 |
| 2006/0068642 | A1 | 3/2006 | Hamaguchi | |
| 2008/0298925 | A1 * | 12/2008 | Shinozaki | 411/48 |
| 2009/0056087 | A1 * | 3/2009 | Arisaka | 24/455 |
| 2011/0014005 | A1 * | 1/2011 | Shinozaki | 411/347 |
| 2011/0170982 | A1 | 7/2011 | Watanabe | |

OTHER PUBLICATIONS

Europe Patent Office, "Search Report for EP 12847825.2," Jun. 12, 2015.

* cited by examiner

CLIP

FIELD OF TECHNOLOGY

The present invention relates to an improvement of a clip formed by a male member and a female member receiving the male member, and in a combined engagement state of both members, the clip is used in such a way as to connect an attachment object on one side to which the female member is attached, to an attachment object on the other side.

BACKGROUND ART

In a grommet (a fastener) formed by a grommet main body and a fixation pin, there is the following grommet. In the grommet, at an insertion time of the fixation pin into the grommet main body, in a case wherein a locking claw formed at an end of the fixation pin is not positioned directly above a fixing protrusion formed inside the grommet main body, there is formed a chamfer portion (a cam portion), slidingly contacting with the locking claw of the fixation pin, and urging a rotation of the fixation pin up to that position, at an entrance of the grommet main body (see Patent Document 1).

In such a grommet, whichever direction the fixation pin is inserted into the grommet main body, both members are smoothly engageable. However, when both members are separated, there is no alternative but to pull the fixation pin out of an inside of the grommet main body by a force with a strength of releasing such an engagement.

PRIOR ART DOCUMENT

Patent Document

Patent Document 1: Japanese Utility Model Publication No. H04-29124

SUMMARY OF THE INVENTION

Problems to be Solved by the Invention

A main object of the present invention is that in this kind of fastener (clip), whichever direction the male member is inserted into the female member, while allowing both members to be smoothly engaged, a disengagement thereof can also be smoothly carried out by a turning operation in one direction of the inserted male member.

Means for Solving the Problems

In order to attain the aforementioned object, in the present invention, a clip comprises a male member provided with a head portion and a shaft portion; and a female member including a base portion and a fitting portion into an attachment hole formed in an attachment object on one side, and provided with a reception hole of the shaft portion of the male member having a hole opening in the base portion and continuing into the fitting portion. In a combined engagement state wherein the shaft portion is inserted into the reception hole up to a predetermined position, the clip is formed to hold an attachment object on the other side between the head portion of the male member and the base portion of the female member. Inside the reception hole of the female member, there are formed a first sliding contact portion relative to a first cam portion, formed at an end of the shaft portion of the male member; an engagement concave portion located on a lateral side of the first sliding contact portion and relative to an engagement protrusion formed in a middle of the shaft portion of the male member; and a second sliding contact portion located at the hole opening of the reception hole and relative to a second cam portion formed in the engagement protrusion of the male member. At an insertion time of the shaft portion into the reception hole, the first cam portion and the first sliding contact portion slidingly contact, and subsequently, the second cam portion and the second sliding contact portion slidingly contact so as to urge a forward-movement and turning of the male member allowing the engagement protrusion to be engaged with the engagement concave portion. Also, when the male member is moved backward and turned from a state wherein the engagement concave portion and the engagement protrusion are engaged, the second cam portion and an inner wall of the engagement concave portion slidingly contact so as to urge an elastic deformation in a direction of allowing the engagement protrusion to come out of the engagement concave portion.

When the shaft portion of the male member is attempted to be inserted into the reception hole of the female member in a direction wherein the engagement protrusion does not enter into the engagement concave portion, i.e., in a direction wherein the engagement protrusion is not positioned directly above the engagement concave portion, the first sliding contact portion abuts against the first cam portion so as to prevent the shaft portion from entering into the reception hole in that direction. However, by a guidance of the first cam portion, the male member can be moved forward and turned toward a position wherein the engagement protrusion enters into the engagement concave portion. Then, when the male member is moved forward and turned by the first sliding contact portion and the first cam portion, and the shaft portion is entered into the reception hole up to a position wherein the second cam portion of the engagement protrusion is positioned in the hole opening of the reception hole, the second sliding contact portion contacts with the second cam portion, and by a guidance of the second cam portion, the male member can be moved forward turned further up to a position wherein the engagement protrusion can engage with the engagement concave portion. Therewith, an engaged and combined state between the male member and the female member as mentioned above can be smoothly released by a backward-movement and turning operation of the male member by slidingly contacting the second cam portion with an entrance portion of the engagement concave portion. In a state wherein the second cam portion and the engagement concave portion, and the engagement protrusion are engaged, preferably, both inner walls or only one inner wall of the engagement concave portion facing the second cam portion are/is formed by an inclination face having an inclination gradually approaching a shaft line in a direction around the shaft line of the shaft portion of the male member.

Inside the reception hole of the female member, there may be formed a third cam portion allowing the shaft portion to move in a direction of coming out of the reception hole by slidingly contacting with the end of the shaft portion when the male member is moved backward and turned from the state wherein the engagement concave portion and the engagement protrusion are engaged. By doing so, the engaged and combined state between the male member and the female member as mentioned above can be more smoothly released by the backward-movement and turning operation of the male member.

A concave portion may be formed in a lateral side of the engagement protrusion in the direction around the shaft line of the shaft portion of the male member, and in a predetermined forward-movement and turning position of the male member, the first sliding contact portion may be entered into the concave portion. Also, in the state wherein the engagement concave portion and the engagement protrusion are engaged, the first sliding contact portion may abut against one step portion inside the concave portion so as to prevent the forward-movement and turning of the male member. By doing so, from the engaged and combined state between the male member and the female member, a turning operation of the male member is allowed only in a backward-movement direction which releases the aforementioned state.

The reception hole may be formed in a blind hole shape, and the engagement concave portion may be formed in the base portion of the female member. By doing so, one side and the other side of the one side attachment object are not communicated through an inside of the female member, and the one side attachment object and the other side attachment object can be connected through the clip with high watertightness or high airtightness.

Effect of the Invention

According to the clip with respect to the present invention, whichever direction the male member is inserted into the female member forming the clip, both members can be smoothly engaged, and a disengagemenL thereof can also be smoothly carried out by a backward-movement turning operation of the inserted male member.

BEST MODES OF CARRYING OUT THE INVENTION

Hereinafter, based on FIG. 1 to FIG. 19, a typical embodiment of the present invention will be explained. A clip according to the embodiment is formed by a male member M and a female member F receiving the male member M, and in a combined engagement state of both members, the clip is used in such a way as to connect an attachment object P on one side to which the female member F is attached, to an attachment object P' on the other side through the clip.

The male member M includes a head portion 1 and a shaft portion 2. On the other hand, the female member F includes a base portion 3 and a fitting portion 4 for an attachment hole Pa formed in the attachment object P on one side; and is provided with a reception hole 5 of the shaft portion 2 of the male member M, having a hole opening 50 in the base portion 3, and continuing into the fitting portion 4. Then, in the combined engagement state between the male member M and the female member F, in which the shaft portion 2 is inserted into the reception hole 5 up to a predetermined position, the attachment object P' on the other side is held between the head portion 1 of such male member M and the base portion 3 of the female member F. In an illustrated example, both the attachment object P on one side and the attachment object P' on the other side are panels.

In the attachment object P on one side, there is formed a square-shaped attachment hole Pa in a penetration state. The fitting portion 4 of the female member F has a cross-sectional surface, in a direction orthogonal to a fitting direction into the attachment hole Pa, having a shape approximately tracing a shape of a hole edge of the attachment hole Pa. Also, the fitting portion 4 of the female member F has a width which can be housed in the attachment hole Pa with a little gap. On the other hand, the base portion 3 of the female member F has a size which cannot be entered into such attachment hole Pa.

In the illustrated example, the base portion 3 includes a seat portion 30 having a circular plate shape. In a center on one face side of the seat portion 30, there is formed a cylindrical protruding portion 31. The fitting portion 4 is integrally connected to the other face side of such seat portion 30. The fitting portion 4 includes a core portion 40 having a cylindrical shape.

A space inside such protruding portion 31 is communicated with a space inside the core portion 40, and by these spaces, the reception hole 5 is formed. At a protruding end of the protruding portion 31, the reception hole 5 is open outward. On the other hand, at a terminal of the core portion 40, the reception hole 5 is closed, and the reception hole 5 has a blind hole shape having the hole opening 50 in the base portion 3.

On both sides sandwiching the core portion 40 in the fitting portion 4, there are respectively formed outer enclosure portions 41. Each outer enclosure portion 41 includes a central plate portion 41a whose one side of a plate is integrally connected to the other face of the seat portion 30. The central plate portions 41a of a pair of outer enclosure portions 41, 41 are parallel. Also, a distance between outer faces of the central plate portions 41a of the pair of outer enclosure portions 41, 41 approximately corresponds to a distance between facing sides of the attachment hole Pa. A protruding length from the seat portion 30 of such central plate portion 41a is slightly larger than a protruding length of the core portion 40. Also, a width of such central plate portion 41a is larger than an outer diameter of the core portion 40. Also, at right and left of the central plate portion 41a, there are respectively formed side plate portions 41b forming approximately right-angled corners 41c throughout an entire length of the fitting portion 4 between the side plate portions 41b and the central plate portion 41a, and continuing to an outer face of the core portion 40. Then, a square shape made by connecting four corners 41c . . . 41c formed by the pair of outer enclosure portions 41, 41 with virtual straight lines approximately corresponds to the shape of the hole edge of the attachment hole Pa.

Spaces 42 opening outward at a terminal of the fitting portion 4 are formed between the core portion 40 and the central plate portions 41a of the outer enclosure portions 41. Also, in the central plate portion 41a of each outer enclosure portion 41, an elastic engagement piece 43 is formed to produce an elastic deformation roughly around a terminal side of the fitting portion 4 by a pair of vertically-divided grooves 41d, 41d continuing toward the terminal from a base of the fitting portion 4; and a horizontally-divided groove 41e ranged between groove ends of the pair of vertically-divided grooves 41d, 41d between the base portion 3 of the fitting portion 4 and the seat portion 30. Outside each elastic engagement piece 43, there is formed an elevated portion 43a by an inclination face 43b allowing a thickness of the elastic engagement piece 43 to gradually increase as the elastic engagement piece 43 moves toward a free end 43c side of the elastic engagement piece 43. A distance between top portions of the elevated portions 43a in the elastic engagement pieces 43 of the pair of outer enclosure portions 41, 41 is slightly larger than a distance between the facing sides of the attachment hole Pa. Thereby, when the fitting portion 4 is inserted into such attachment hole Pa, the inclination face 43b of the elevated portion 43a slidingly contacts with a hole edge portion of the attachment hole Pa, and the elastic engagement pieces 43 bend into the aforementioned spaces so as to allow the insertion. When the fitting portion 4 is inserted into the attachment hole Pa up to a position wherein a free end 43c of the elastic engagement piece 43 crosses over the hole edge on an insertion end side of the attachment hole Pa, the elastic engagement piece 43 returns to bend, and the free end 43c is engaged with such hole edge portion. Thereby, when the fitting portion 4 of the female member F is inserted into the attachment hole Pa of the attachment object P on one side, the female member F is attached to the attachment object P on one side with a single touch of a finger. In such an attachment state, the reference symbol 6 in the drawing represents an elastic seal material provided to surround the base of the fitting portion 4 in such a way as to seal between the other face of the seat portion 30 forming the base portion 3 and the attachment object P on one side.

Also, in the protruding portion 31, there are formed engagement concave portions 32 relative to engagement protrusions of the later-described male member M on both sides in a diametrical direction thereof. In the illustrated example, such engagement concave portions 32 are formed by square-shaped holes penetrating side portions of the protruding portion 31. Such engagement concave portion 32 includes a pair of sides along a protruding direction of the protruding portion 31, and a pair of sides orthogonal thereto.

Also, there are formed flanges 33 which are protruding ends of the protruding portion 31, and respectively project outward in a directly above position of the engagement concave portions 32. In an outer end of each flange 33, there is integrally connected an upper end of a rising portion 34 rising from one face of the seat portion 30 at an interval between the rising portion 34 and an outer face of the protruding portion 31.

The hole opening 50 of the reception hole 5 includes a small diameter portion 51 tracing an inner face of the protruding portion 31 and a large diameter portion 52 along an arc of a virtual circle (not shown in the figures) including the outer face of the protruding portion 31. The large diameter portion 52 is formed immediately above the engagement concave portion 32 at a formation portion of the flange 33. Corners 53 are formed between such large diameter portion 52 and the small diameter portion 51, which function as the later-described second sliding contact portions Cf2.

On the other hand, in the illustrated example, the shaft portion 2 of the male member M has a cylindrical shape opening at an end 20 thereof. Also, engagement protrusions 21 relative to the engagement concave portions 32 are provided in a middle of the shaft portion 2 between the end 20 and the head portion 1. Such engagement protrusions 21 are respectively formed on both sides in a diametrical direction of the shaft portion 2. In the illustrated example, there is formed an elastic piece 24 formed in such a way as to provide an elastic deformation roughly around an end 20 side of the shaft portion 2 in a middle of the shaft portion 2 by a pair of vertically-divided grooves 22, 22 continuing along a shaft line of the shaft portion 2; and a horizontally-divided groove 23 ranged between groove ends positioned on a head portion 1 side in the pair of vertically-divided grooves 22, 22. Then, outside the elastic piece 24, there are formed the engagement protrusions 21 by forming inclination faces 21a allowing a thickness of the elastic piece 24 to gradually increase as the elastic piece 24 moves toward a free end 24a side of the elastic piece 24.

A distance between the end 20 of the shaft portion 2 and a free end 24a of the elastic piece 24 approximately corresponds to a distance between a hole bottom 54 of the reception hole 5 providing the blind hole shape and an inner wall positioned on a hole opening 50 side of the reception hole in the engagement concave portion 32. Also, a distance between top portions of a pair of engagement protrusions 21, 21 is slightly larger than a diameter of the virtual circle along the large diameter portion 52 in the reception hole 5. Thereby, when the shaft portion 2 of the male member M is inserted into the reception hole 5 of the female member F in a direction wherein the engagement protrusion 21 is entered into the engagement concave portion 32, the inclination face 21a of the engagement protrusion 21 slidingly contacts with a hole edge portion of the large diameter portion 52 in the reception hole 5, and the elastic piece 24 bends into an inside of the shaft portion 2 so as to allow that insertion. When the insertion is carried out up to a position wherein the free end 24a of the elastic piece 24 is positioned under the inner wall positioned on the hole opening 50 side of the reception hole 5 in the engagement concave portion 32, the elastic piece 24 returns to bend, and the engagement protrusion 21 enters into the engagement concave portion 32. Thereby, when the shaft portion 2 of the male member M is inserted into the reception hole 5 of the female member F, the male member M and the female member F can be engaged and combined with a single touch of a finger.

In the illustrated example, the head portion 1 of the male member M has approximately a rectangular plate shape with a length not allowing to pass through a penetration hole P'a provided in the attachment object P' on the other side. In the shaft portion 2, an end portion opposite to the end 20 of the shaft portion 2 is integrally connected in a position roughly in a middle in a length direction thereof on one face side of the head portion 1. On the other face side of the head portion 1, and in a position roughly in a middle in the length direction thereof, there is formed a concave portion 10 in which the end 20 of a driver can be housed.

Figure 1:
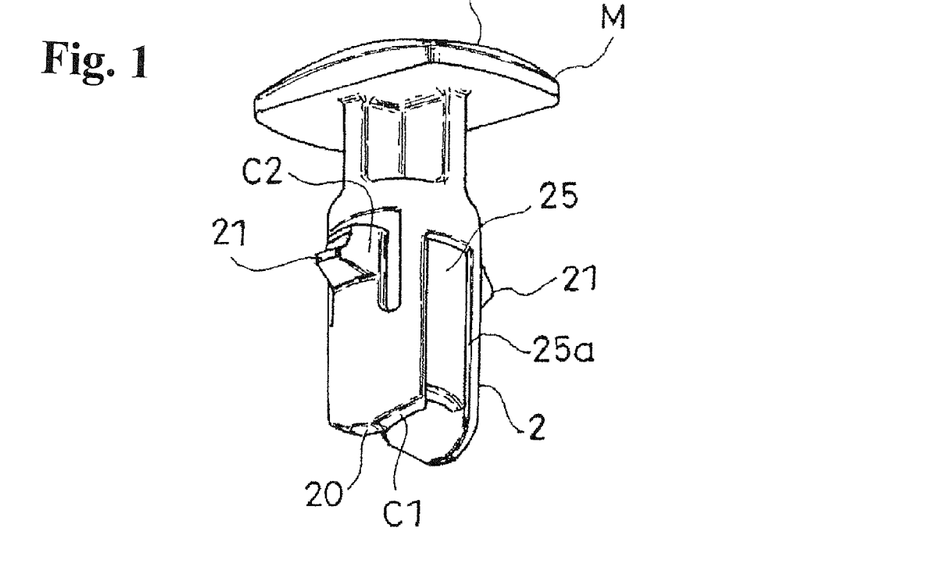
FIG. 1 is a perspective view separately showing a male member and a female member forming a clip according to an embodiment of the present invention.
Figure 2:
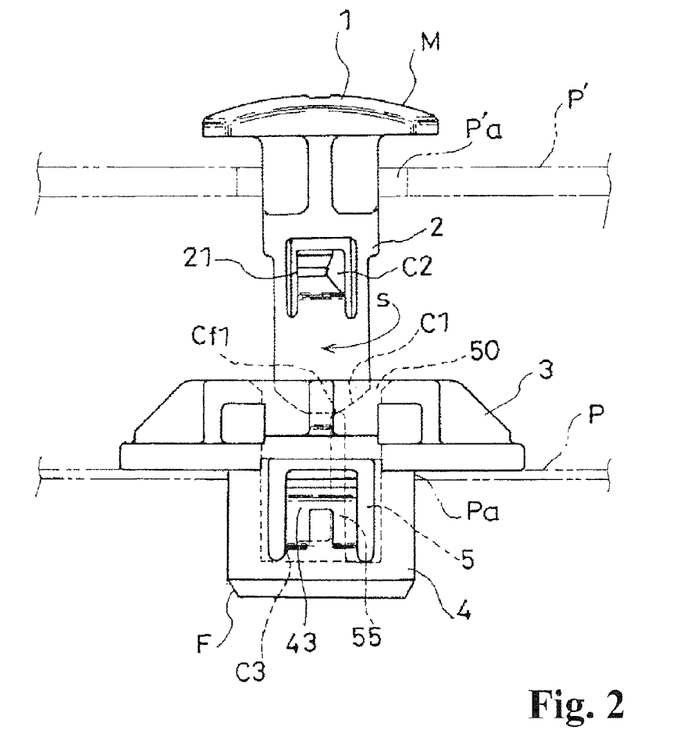
FIG. 2 is a side view showing a state wherein a shaft portion of the male member starts to be inserted into the female member.
Figure 3:
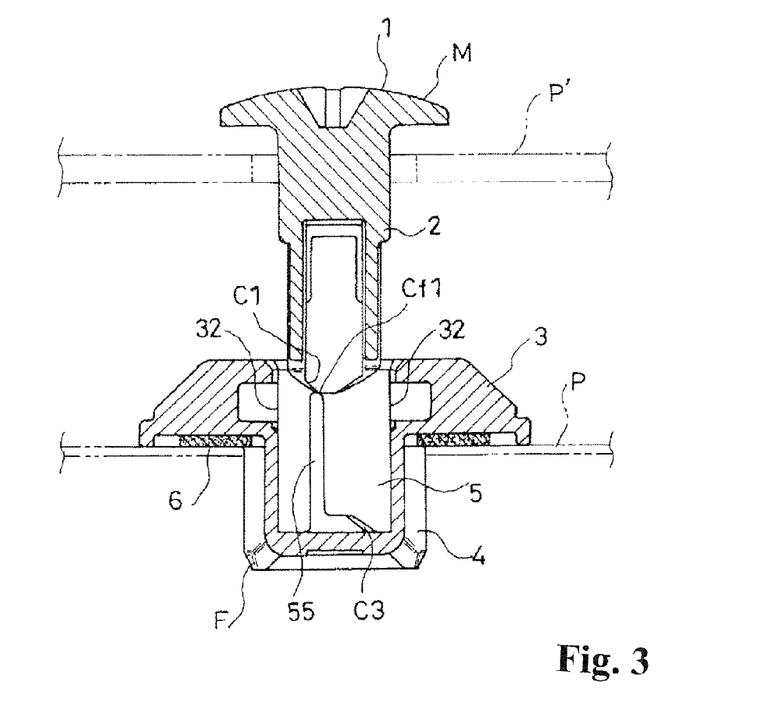
FIG. 3 is a cross-sectional view of a state in FIG. 2.
Figure 4:
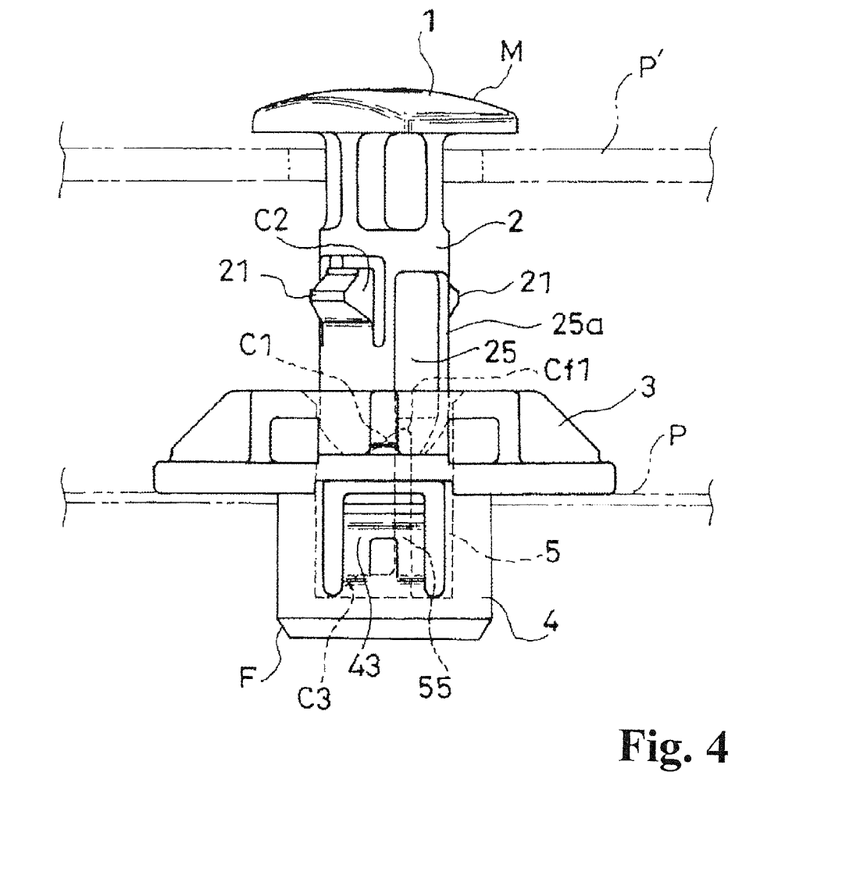
FIG. 4 is a side view showing a state wherein the shaft portion of the male member is moved forward to be turned from the state in FIG. 2, and the shaft portion is further entered into the female member more than the state in FIG. 2.
Figure 5:
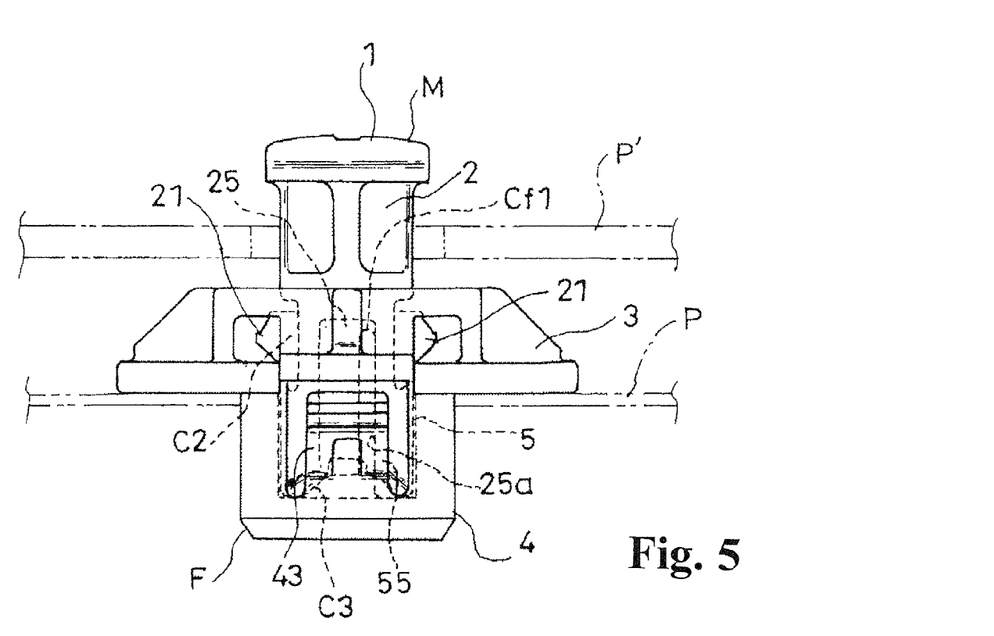
FIG. 5 is a side view showing an engagement state between the male member and the female member.
Figure 6:
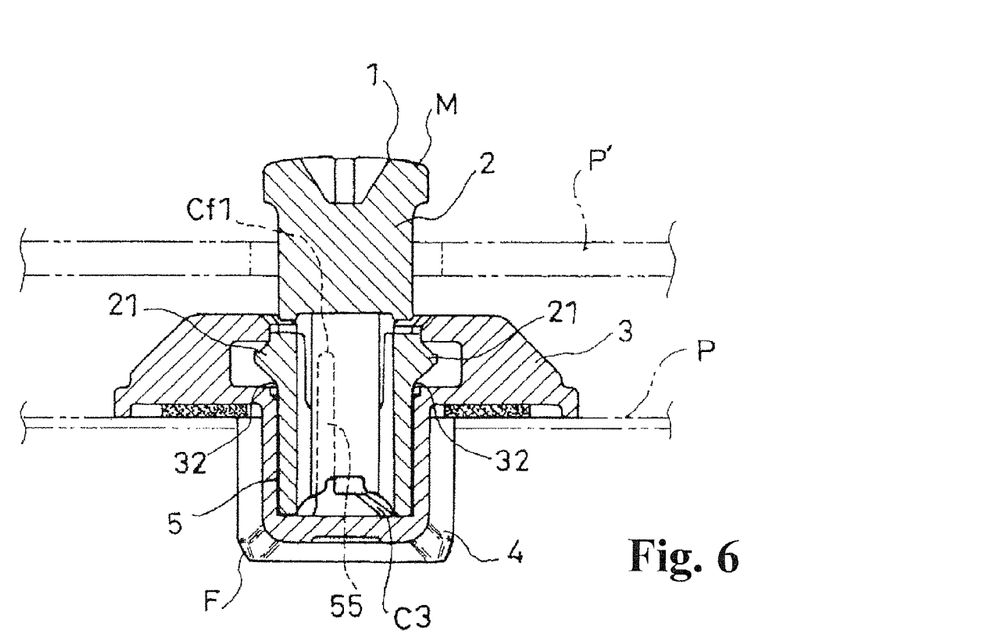
FIG. 6 is a cross-sectional view of a state in FIG. 5.
Figure 7:
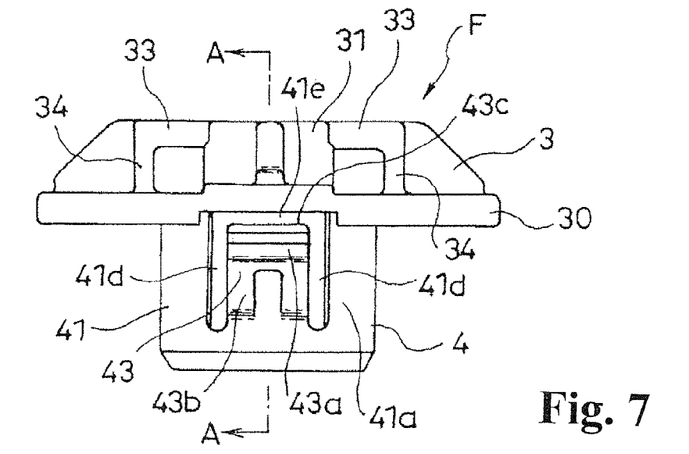
FIG. 7 is a side view of the female member.
Figure 8:
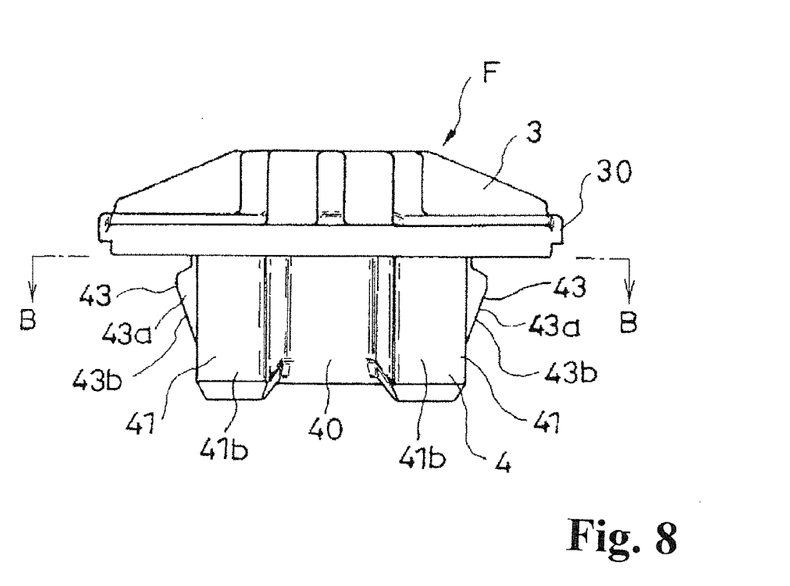
FIG. 8 is a side view showing the female member viewed from a 90-degree different direction from FIG. 7.
Figure 9:
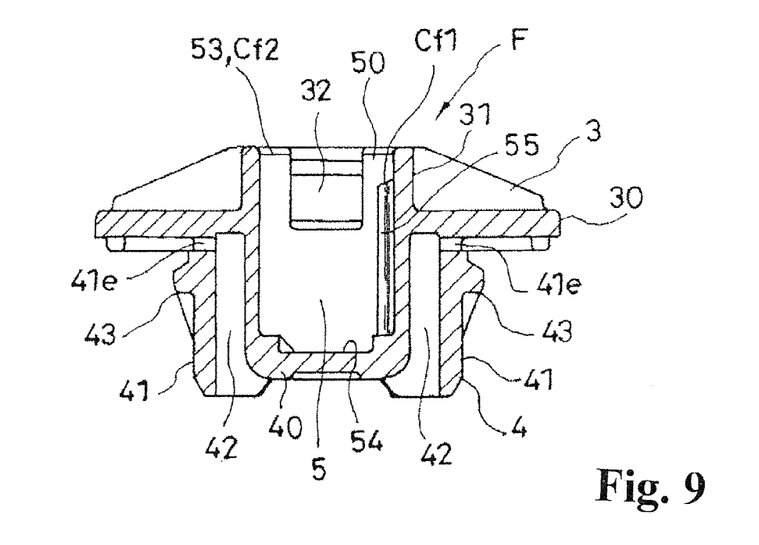
FIG. 9 is a cross-sectional view taken along a line A-A in FIG. 7.
Figure 10:
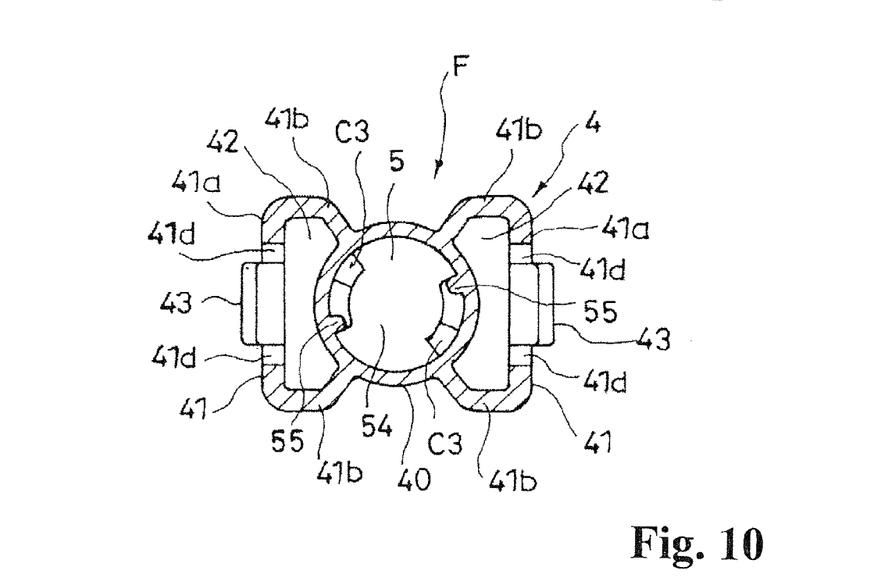
FIG. 10 is a cross-sectional view taken along a line B-B in FIG. 8.

From a state wherein the female member F is attached to the attachment object P on one side as mentioned above, the shaft portion 2 of the male member M passing through the penetration hole P'a of the attachment object P' on the other side to be protruded is inserted into the reception hole 5 of such female member F, and the male member M and the female member F are engaged as mentioned above, so that the attachment object P' on the other side is held between the head portion 1 of the male member M and the base portion 3 of the female member F, i.e., between the head portion 1 of the male member M and the attachment object P on one side. (FIG. 5 and FIG. 6)

In the embodiment, the reception hole 5 has the blind hole shape, and the engagement concave portion 32 is formed in the base portion 3 of the female member F, so that through an inside of the female member F, one side and the other side of the attachment object P on one side are not allowed to be communicated, and through the clip, the attachment object P on one side and the attachment object P' on the other side can be connected with high water-tightness or high airtightness.

Also, in the embodiment, inside the reception hole 5 of the female member F, there are formed first sliding contact portions Cf1 relative to first cam portions C1 formed in the end 20 of the shaft portion 2 of the male member M; and the second sliding contact portions Cf2 relative to second cam portions C2 formed in the engagement protrusions 21 of the male member M in the hole opening 50 of the reception hole 5.

Then, at an insertion time of the shaft portion 2 into the reception hole 5, the first cam portion C1 and the first sliding contact portion Cf1 slidingly contact, and subsequently, the second cam portion C2 and the second sliding contact portion Cf2 slidingly contact so as to urge forward-movement turning of the male member M, which allows the engagement protrusion 21 to be engaged with the engagement concave portion 32.

In the illustrated example, the first sliding contact portions Cf1 are formed in the small diameter portion 51 of the reception hole 5. Therefore, such first sliding contact portions Cf1 are provided on lateral sides of the engagement concave portions 32 in a direction around a hole shaft of the reception hole 5. In the illustrated example, the first sliding contact portions Cf1 are formed respectively on both sides in a diametrical direction of the reception hole 5 on the lateral sides of the engagement concave portions 32. In the illustrated example, each first sliding contact portion Cf1 is formed by an end portion positioned on the hole opening 50 side of a rib-like body 55 ranged from the hole bottom 54 of the reception hole 5 up to a portion positioned slightly on an inner side than the hole opening 50 of the reception hole 5, and extending along the hole shaft of the reception hole 5.

Figure 11:
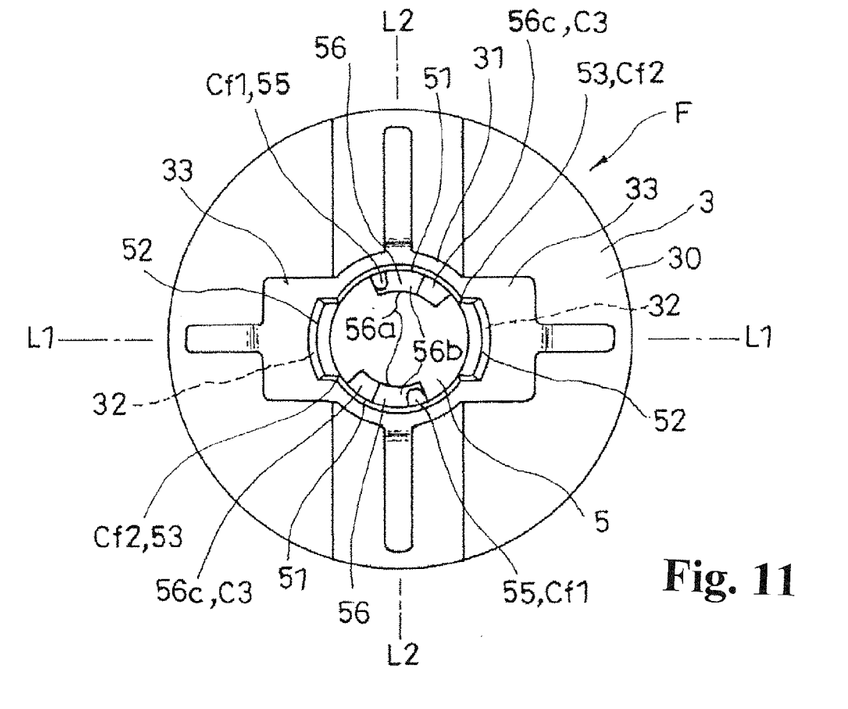
FIG. 11 is a plan view of the female member.
Figure 12:
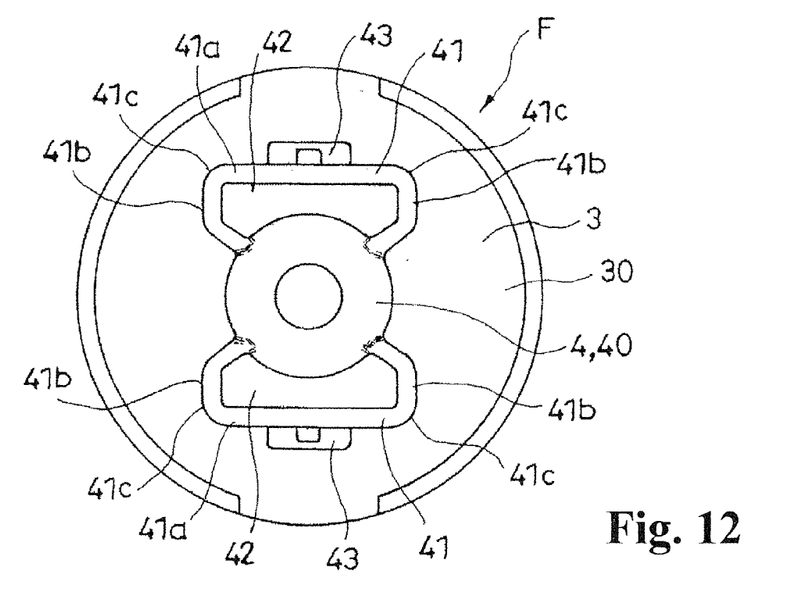
FIG. 12 is a bottom view of the female member.
Figure 13:
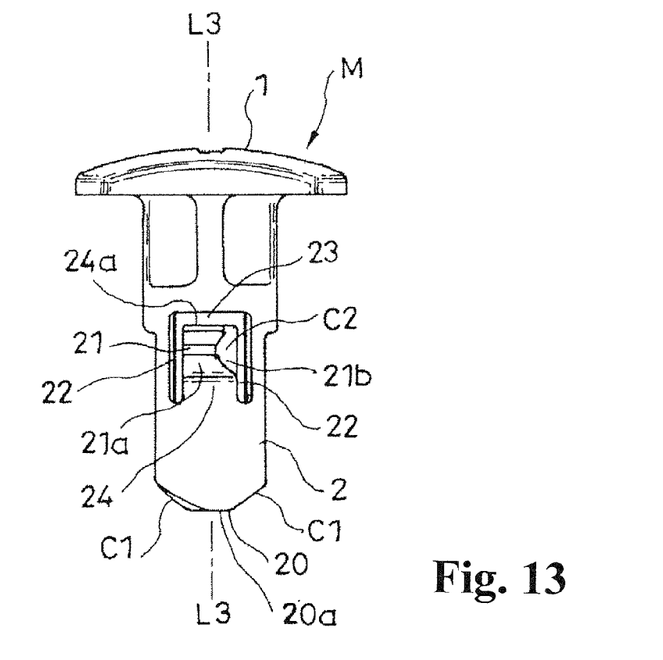
FIG. 13 is a side view of the male member.
Figure 14:
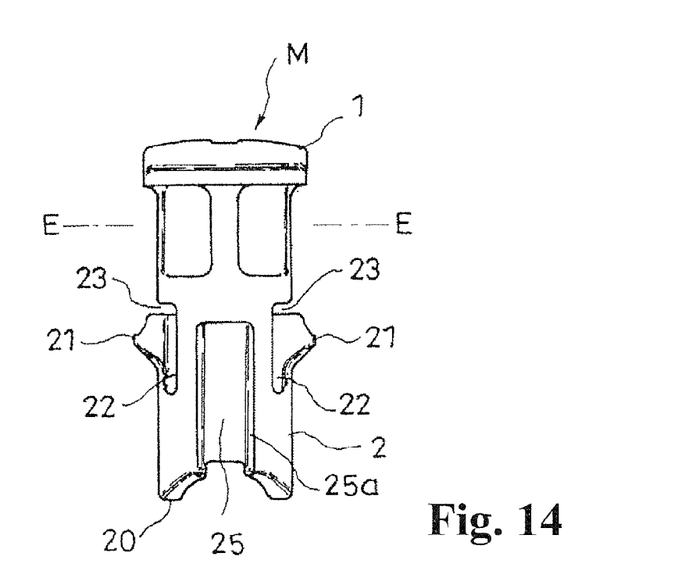
FIG. 14 is a side view showing the male member viewed from a 90-degree different direction from FIG. 13.
Figure 15:
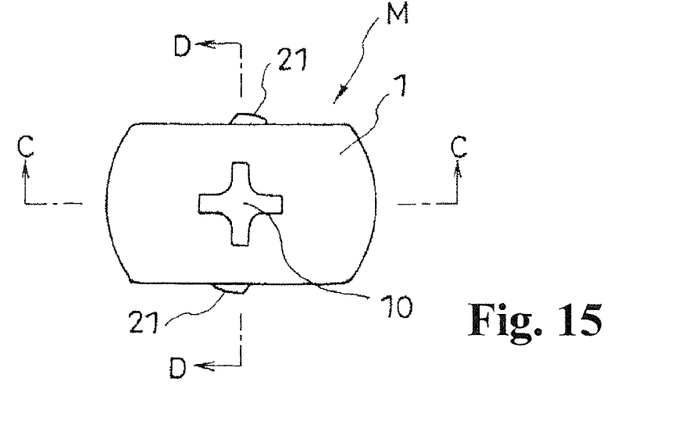
FIG. 15 is a plan view of the male member.
Figure 16:
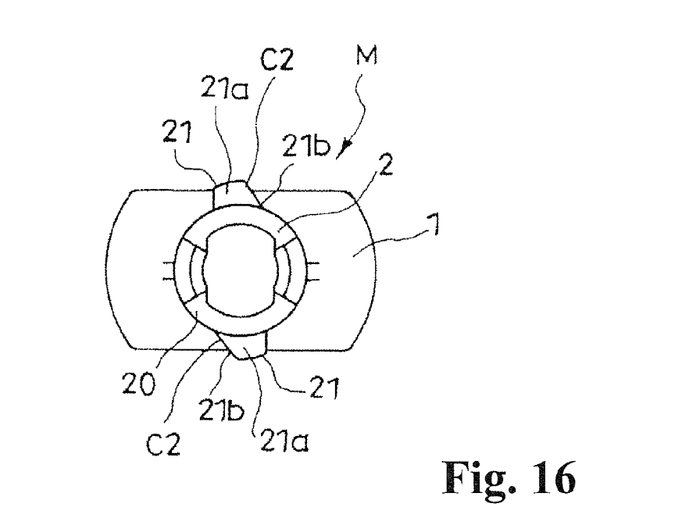
FIG. 16 is a bottom view of the male member.
Figure 17:
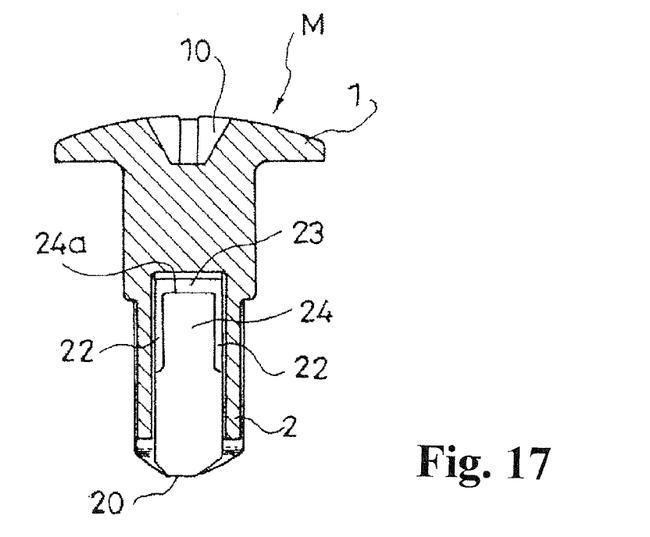
FIG. 17 is a cross-sectional view taken along a line C-C in FIG. 15.
Figure 18:
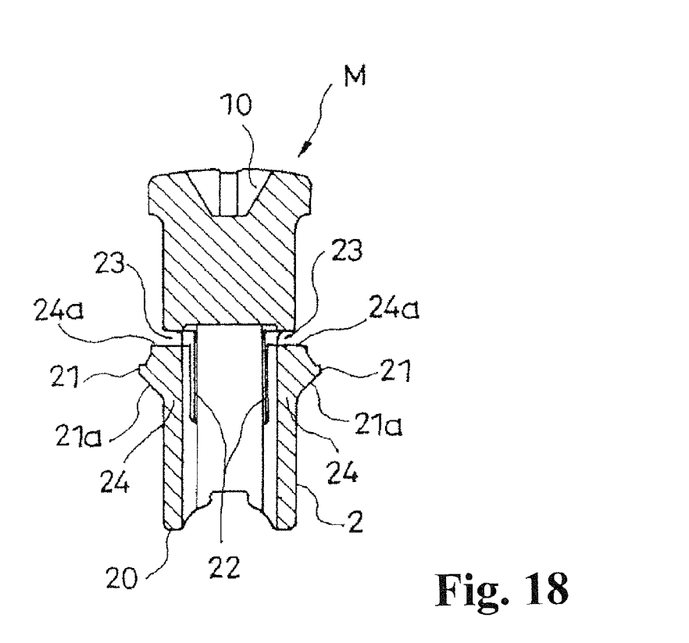
FIG. 18 is a cross-sectional view taken along a line D-D in FIG. 15.
Figure 19:
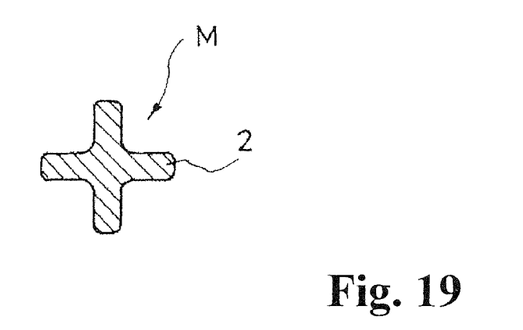
FIG. 19 is a cross-sectional view taken along a line E-E in FIG. 14.

One of two first sliding contact portions Cf1 is positioned on one engagement concave portion 32 side sandwiching the center of the pair of engagement concave portions 32 and a virtual second straight line L2 orthogonal in the hole shaft in a virtual first straight line L1 passing through the hole shaft of the reception hole 5, and the other of the two first sliding contact portions Cf1 is positioned on the other engagement concave portion 32 side sandwiching the center of the pair of engagement concave portions 32 and such second straight L2. (FIG. 11)

On the other hand, the first cam portions C1 are the end of the shaft portion 2 of the male member M, and are respectively formed at portions directly underneath the pair of engagement protrusions 21, 21. In the illustrated example, such portions of the end 20 of the shaft portion 2 of the male member M are respectively formed in such a way as to have a top portion 20a on a virtual straight line L3 along the shaft line of the shaft portion 2 dividing the elastic piece 24 into two to right and left, and to provide a mountain shape respectively inclining right and left of the top portion 20a. (FIG. 13) Then, in the illustrated example, one of the inclining portions functions as the first cam portion C1.

Also, on an outer face of a portion positioned between the pair of first cam portions C1, C1 in the shaft portion 2 of the male member M, i.e., an outer face of a portion which becomes a lateral side of the engagement protrusion 21 in a direction around the shaft line of the shaft portion 2 of the male member M, there are formed concave portions 25 opening outward in the end 20 of the shaft portion 2 and having a wide groove shape continuing to the head portion 1 side.

A distance between a pair of first sliding contact portions Cf1, Cf1 formed in the reception hole 5 of the female member F is slightly smaller than an outer diameter at a formation portion of the first cam portion C1 of the shaft portion 2 of the male member M. On the other hand, a distance between the pair of first sliding contact portions Cf1, Cf1 formed in the reception hole 5 of the female member F is approximately equal to an outer diameter (a distance between groove bottoms of two concave portions 25, 25) at formation portions of the concave portions 25 of the shaft portion 2 of the male member M. Also, a groove width of such concave portion 25 is wider than a width of the first sliding contact portion Cf1.

Thereby, in the embodiment, when the shaft portion 2 of the male member M is attempted to be inserted into the reception hole 5 of the female member F in a direction wherein the engagement protrusion 21 does not enter into the engagement concave portion 32, i.e., in a direction wherein the engagement protrusion 21 is not positioned directly above the engagement concave portion 32, the two first sliding contact portions Cf1, Cf1 abut against the respective corresponding first cam portions C1 so as to prevent the shaft portion 2 from entering into the reception hole 5 in that direction. However, by a guidance of the first cam portion C1 inclining as mentioned above, the male member M can be moved forward and turned (this turning direction is shown by an arrow s in FIG. 2) toward a position wherein the engagement protrusion 21 enters into the engagement concave portion 32. Therewith, when such forward-movement turning is carried out up to a position wherein the first sliding contact portion Cf1 enters into the concave portion 25, the male member M is allowed to enter into the reception hole 5 of the shaft portion 2.

Also, in the illustrated example, in the engagement protrusion 21 of the shaft portion 2 of the male member M, a side portion on one side sandwiching the virtual straight line L3 along the shaft line of the shaft portion 2 dividing the elastic piece 24 into two to right and left becomes an inclination face 21b with height increasing as approaching the virtual straight line L3, and the inclination face 21b of the engagement protrusion 21 functions as the second cam portion C2. In the illustrated example, among the two engagement protrusions 21, in the engagement protrusion 21 positioned on a front face side in FIG. 13, there is formed the second cam portion C2 on a right side sandwiching the aforementioned virtual straight line. Also, in the engagement protrusion 21 positioned on a back face side thereof, there is formed the second cam portion C2 on a left side sandwiching the aforementioned virtual straight line.

When the male member M is moved forward and turned by the first sliding contact portion Cf1 and the first cam portion C1, and the shaft portion 2 is entered into the reception hole 5 up to a position wherein the second cam portion C2 of the engagement protrusion 21 is positioned in the hole opening 50 of the reception hole 5, the respective corresponding second sliding contact portions Cf2 contact with the two second cam portions C2, and by a guidance of the second cam portion C2 inclining as mentioned above, the male member M can be moved forward and turned further up to the position wherein the engagement protrusion 21 enters into the engagement concave portion 32.

Also, in the embodiment, when the male member M is moved backward and turned from a state wherein the engagement concave portion 32 and the engagement protrusion 21 are engaged, by a sliding contact between the second cam portion C2 and an inner wall of the engagement concave portion 32, an elastic deformation is urged in a direction of allowing the engagement protrusion 21 to come out of the engagement concave portion 32.

Thereby, in the clip according to the embodiment, a state wherein the male member M and the female member F are engaged and combined can be released by a backward-movement and turning operation of the male member M.

In the illustrated example, the second cam portion C2 is formed by the inclination face 21b having an inclination gradually approaching the shaft line as moving toward the aforementioned backward-movement destination in the direction around the shaft line of the shaft portion 2 of the male member M, and when the male member M is moved backward and turned as mentioned above, the second cam portion C2 contacts with the inner wall of the engagement concave portion 32, and the elastic piece 24 is bent into the inside of the shaft portion 2 so as to allow the engagement protrusion 21 to come out of the engagement concave portion 32.

Aside from the illustrated example, in a state wherein the second cam portion C2 and the engagement concave portion 32, and the engagement protrusion 21 are engaged, even if both the inner walls of the engagement concave portion 32 facing the second cam portion C2, or only side inner wall of the engagement concave portion 32 are/is formed by such an inclination face, the same effect can be attained.

Also, in the embodiment, inside the reception hole 5 of the female member F, there are formed third cam portions C3 moving the shaft portion 2 in a direction of coming out of the reception hole 5 by slidingly contacting with the end 20 of the shaft portion 2 when the male member M is moved backward and turned from the state wherein the engagement concave portion 32 and the engagement protrusion 21 are engaged.

In the illustrated example, in an engagement state wherein the shaft portion 2 of the male member M is completely inserted into the reception hole 5 of the female member F, the third cam portions C3 are entered into portions between the pair of first cam portions C1, C1 of the shaft portion 2 from a hole bottom 54 side of the reception hole 5. Specifically, each third cam portion C3 includes an inner face 56a having approximately the same face as the end 20 of the rib-like body forming the first sliding contact portion Cf1, and continuing into this; an upper step face 56b facing the hole opening 50 of the reception hole 5; and a lateral step face 56c located on a side opposite to a connection side of the rib-like body 55, and the third cam portion C3 is formed by each lateral step face 56c of bulge portions 56 formed in the inner wall on the hole bottom 54 side of the reception hole 5. Such lateral step face 56c includes an inclination in a direction of reducing a size in the direction around the hole shaft of the reception hole 5 of the bulge portion 56 as heading for the upper step face 56b. Thereby, when the male member M is moved backward and turned as mentioned above from the engagement state, the first cam portion C1 slidingly contacts with the third cam portion C3, and the male member M is lifted in a direction of allowing the shaft portion 2 to come out of the reception hole 5.

Thereby, in the embodiment, the state wherein the male member M and the female member F are engaged and combined can be more smoothly released by the backward-movement and turning operation of the male member M.

Also, in the embodiment, in a predetermined forward-movement and turning position of the male member M, the first sliding contact portion Cf1 is entered into the concave portion 25 of the aforementioned shaft. Also, in the state wherein the engagement concave portion 32 and the engagement protrusion 21 are engaged, the first sliding contact portion Cf1 abuts against one step portion 25a among the concave portions 25 so as to prevent the forward-movement and turning of the male member M. (FIG. 5) Thereby, in the embodiment, from the state wherein the male member M and the female member F are engaged and combined, a turning operation of the male member M is allowed only in a backward-movement direction which releases the state wherein the male member M and the female member F are engaged and combined.

Providing an elastic deformation characteristic to a portion expected to have the elastic deformation characteristic in the clip according to the embodiment can be easily realized by making the male member M and the female member F forming the clip as a plastic molded article.

All contents of the specification, claims, drawings, and abstract of Japanese Patent Application No. 2011-247263 filed on Nov. 11, 2011 are cited in their entireties herein and are incorporated as a disclosure of the specification of the present invention.

What is claimed is:

1. A clip, comprising:
a male member having a head portion and a shaft portion; and
a female member including a base portion and a fitting portion into an attachment hole formed in one side attachment object, and provided with a reception hole of the shaft portion of the male member, having a hole opening in the base portion and continuing into the fitting portion,
wherein the clip is formed to hold another side attachment object between the head portion of the male member and the base portion of the female member in a combined engagement state wherein the shaft portion is inserted into the reception hole up to a predetermined position,
an inside of the reception hole of the female member includes:
a first sliding contact portion relative to a first cam portion formed at an end of the shaft portion of the male member;
an engagement concave portion located on a lateral side of the first sliding contact portion and relative to an engagement protrusion formed in a middle of the shaft portion of the male member; and
a second sliding contact portion located at a hole opening of the reception hole and relative to a second cam portion formed at the engagement protrusion of the male member,
at an insertion time of the shaft portion into the reception hole, the first cam portion and the first sliding contact portion slidingly contact, and subsequently, the second cam portion and the second sliding contact portion slidingly contact so as to urge a forward-movement and turning of the male member, which allows the engagement protrusion to be engaged with the engagement concave portion, and
when the male member is moved backward and turned from an engaged state between the engagement concave portion and the engagement protrusion, the second cam portion and an inner wall of the engagement concave portion slidingly contact so as to urge an elastic deformation in a direction of allowing the engagement protrusion to come out of the engagement concave portion.

2. A clip according to claim 1, wherein a third cam portion is formed inside the reception hole of the female member, which allows the shaft portion to move in a direction of coming out of the reception hole by slidingly contacting with an end of the shaft portion when the male member is moved backward and turned from the engaged state between the engagement concave portion and the engagement protrusion.

3. A clip according to claim 1, wherein in an engaged state among the second cam portion, the engagement concave portion, and the engagement protrusion, one or two inner walls of the inner walls of the engagement concave portion facing the second cam portion are formed by an inclination face having an inclination gradually approaching a shaft line in a direction around the shaft line of the shaft portion of the male member.

4. A clip according to claim 1, wherein a concave portion is formed on a lateral side of the engagement protrusion in a direction around the shaft line of the shaft portion of the male member, and in a predetermined forward-movement turning position of the male member, the first sliding contact portion is entered into the concave portion, and in the engaged state between the engagement concave portion and the engagement protrusion, the first sliding contact portion abuts against one step portion inside the concave portion so as to prevent a forward-movement turning of the male member.

5. A clip according to claim 1, wherein the reception hole is formed in a blind hole shape, and the engagement concave portion is formed in the base portion of the female member.

* * * * *